United States Patent [19]

Boyer

[11] Patent Number: 4,539,497
[45] Date of Patent: Sep. 3, 1985

[54] ELECTRICAL GENERATOR WITH RING HOUSING MOUNTABLE ON A WHEEL ASSEMBLY

[76] Inventor: Robert E. Boyer, 2650 Davison St., River Grove, Ill. 60171

[21] Appl. No.: 483,710

[22] Filed: Apr. 11, 1983

[51] Int. Cl.³ .............................................. H02K 7/10
[52] U.S. Cl. .................... 310/75 R; 310/83; 310/89; 310/90; 310/268; 74/752 F; 180/65.5; 322/3
[58] Field of Search .............. 310/89, 67 A, 168–171, 310/75 R, 75 C, 268, 83, 90, 154, 67 R, 77, 92, 99; 74/421 R, 752 F; 322/3; 180/65.5; 280/212; 340/58; 290/1 R

[56] References Cited

U.S. PATENT DOCUMENTS

| | | | |
|---|---|---|---|
| 2,265,454 | 12/1941 | Schwab | 310/67 A |
| 3,161,249 | 12/1964 | Bouladon | 180/65.5 |
| 3,544,822 | 12/1970 | Pickles | 310/268 |
| 3,860,772 | 1/1975 | Byrd | 200/61.25 |
| 4,021,690 | 5/1977 | Burton | 310/67 R |
| 4,075,603 | 2/1978 | Snyder | 340/58 |
| 4,093,897 | 6/1978 | Fujita | 310/268 |

FOREIGN PATENT DOCUMENTS 0252618  1/1948  Switzerland .......................... 310/83

OTHER PUBLICATIONS

Truck Repair Manual; 32nd Ed.; L. C. Forier; FIG'S 24 & 27; received in Arlington Height Memorial Library on 5/24/79.

*Primary Examiner*—R. Skudy
*Attorney, Agent, or Firm*—Leo J. Aubel; Robert E. Wagner

[57] ABSTRACT

An electrical generator utilizing a pendulum in the generator drive mechanism to provide a non-rotating reference whereby rotation of the wheel drives elements of the generator into rotation with respect to one another. The assembly is mounted in a wheel-mounted toroidal-shaped housing having a passage accommodating the vehicle axle to allow the unit to be mounted close inboard against the wheel or, alternatively, behind the wheel or within a brake system.

9 Claims, 10 Drawing Figures

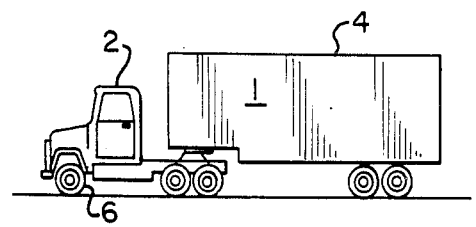
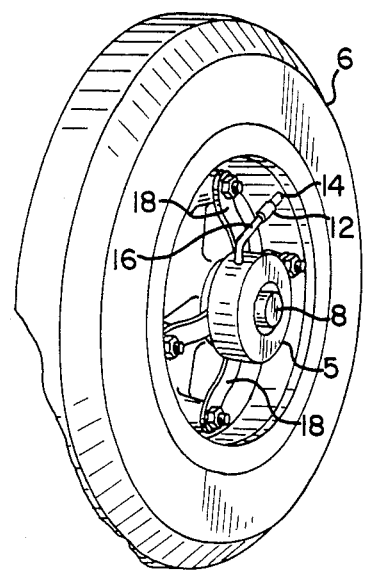
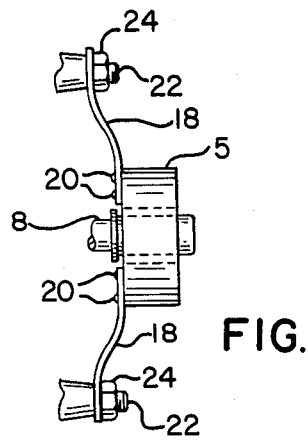
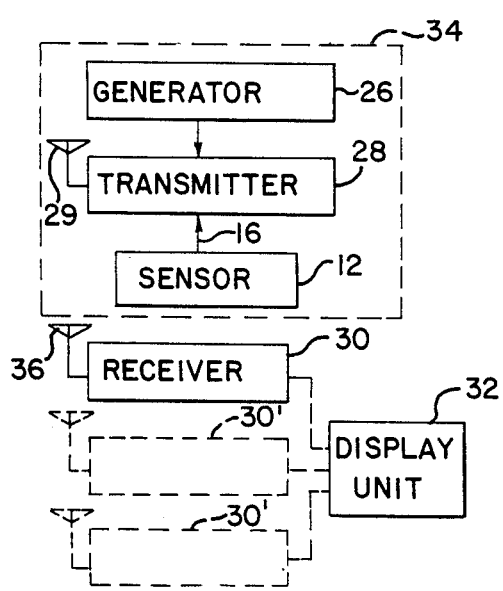
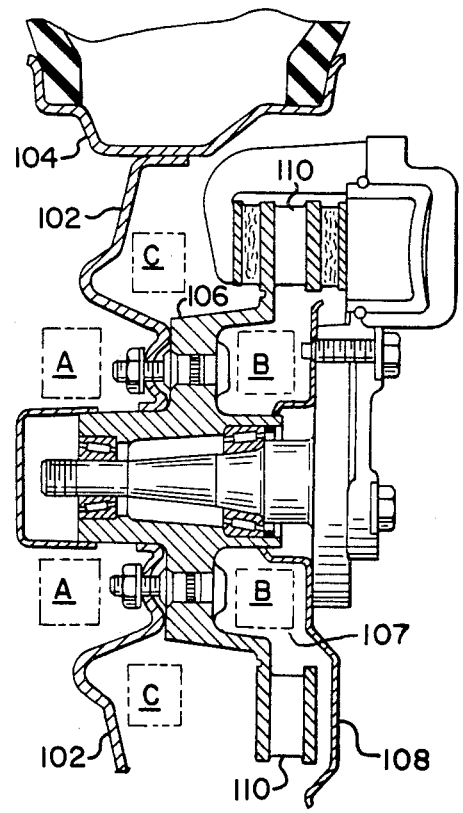

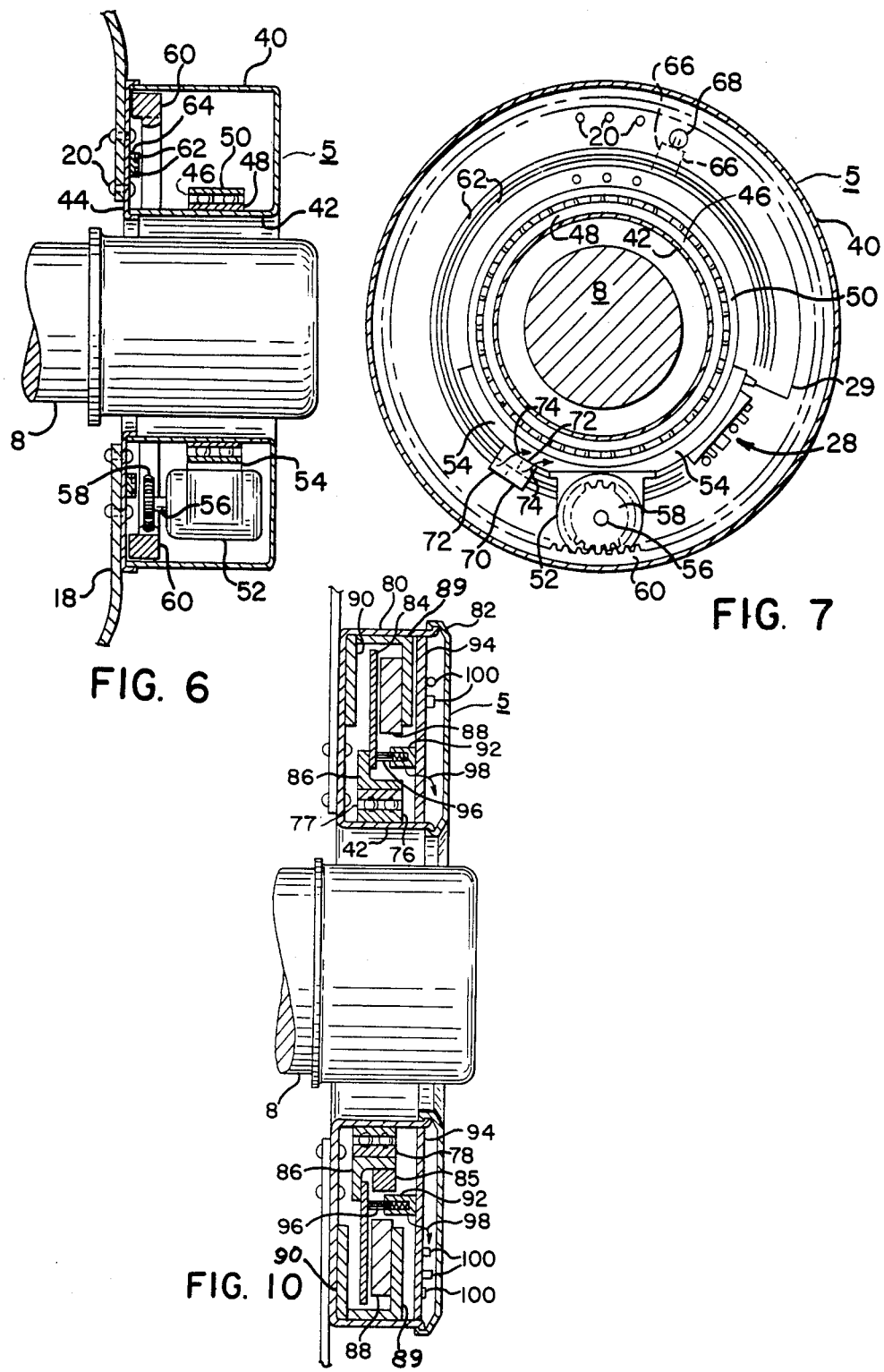

ELECTRICAL GENERATOR WITH RING HOUSING MOUNTABLE ON A WHEEL ASSEMBLY

TECHNICAL FIELD

A vehicle mountable driveless electrical generator with a housing and structure mounted around an axle of a vehicle.

BACKGROUND OF INVENTION

In a related patent application, Ser. No. 417,473, entitled VEHICLE MOUNTABLE ELECTRICAL GENERATING SYSTEM, filed Sept. 13, 1982, and specifically incorporated herein by reference, the inventor has disclosed electrical generating systems suitable for wheel mounting on automotive vehicles, particularly semi-trailer trucks, to power an associated signal transmitter which is responsive such as to a tire pressure sensor.

The generating systems described in application Ser. No. 417,473 employ a pendulum journaled about the axis of rotation of the wheel on which the assembly is mounted, the pendulum remaining essentially stationary during wheel rotation to provide a mechanically coupled non-rotating reference whereby the armature and magnetic field structure are driven into relative rotation with respect to each other. An integral overspeed gearing system generates a potential in response to wheel rotation, and thus provides power to the transmitter at the lower vehicle speeds.

The wheels of semi-trailers have wheel assemblies wherein the webs of the outer wheels are configured concavely inward, with the axle assembly ends well inboard of the outermost lateral extension of the trailer body, and ample space is available for the generator-transmitter assembly of the aforementioned invention. Thus, the generating systems of the Applicant's related patent application are suitable for mounting axially outwardly of the vehicle axis assembly.

However, the front wheels of the cab or tractor pulling the semi-trailer have wheel webs which typically face convexly outwardly; and the axle assembly ends are disposed somewhat outboard of the tractor body. Devices mounted axially outwardly of the front axle assemblies would project well outboard of the vehicle, possibly being hazardous, would be vulnerable to damage and also may comprise a safety hazard.

The generating system described in U.S. patent application Ser. No. 417,473 and the toroidal-shaped generating system described herein are electrically and mechanically compatible with each other. A desirable condition would be to use the system of the present invention on the convexed front wheels while using the system of said Ser. No. 417,473 on the rear concave wheels of the truck tractor and trailer.

SUMMARY OF INVENTION

The present invention discloses a wheel-mounted generator contained within a toroidal-shaped housing which mounts on the wheel assembly. A passage through the housing allows the axle to pass therethrough, allowing the housing to be mounted close inboard; that is, axially inwardly from the end of the axle. A pendulum journaled about the housing passage provides a stationary reference for the generator.

In one embodiment, a ring gear fixed in the housing and rotating therewith engages a pinion gear on the generator armature shaft; the generator being mounted on a pendulum. Rotation of the housing rotates the ring gear to drive the relatively stationary generator pinion to provide power to the associated transmitter. The gearing ratio drives the generator at a rate greater than the wheel rotation rate.

Other objects, advantages and features of the invention will become apparent upon making reference to the description to follow, the drawings and the claims.

DESCRIPTION OF DRAWINGS

FIG. 1 is a plan view of a known tractor and semi-trailer truck;

FIG. 2 is a perspective view of the inventive assembly mounted about the axle of a wheel and affixed thereto;

FIG. 3 is a fragmentary plan view, showing a method of attachment of the inventive assembly of FIG. 2 to the wheel;

FIG. 4 is a block diagram, showing a functional relationship between the generator, transmitter, sensors, receivers and a display unit;

FIG. 5 is an elevational view of a wheel and rim mounted on an axle, showing an alternative disposition of the inventive assembly to be used with vehicles equipped with disc brakes;

FIG. 6 is a partial cross-sectional side elevation of one embodiment of the inventive assembly, wherein a pendulum-mounted generator is driven by a ring gear affixed to a housing;

FIG. 7 is a cross-sectional front elevation of the embodiment shown in FIG. 6;

FIG. 10 is a partial cross-sectional side elevation of another embodiment of the invention, also employing a pancake armature.

DETAILED DESCRIPTION OF INVENTION

Figures 8, 9:
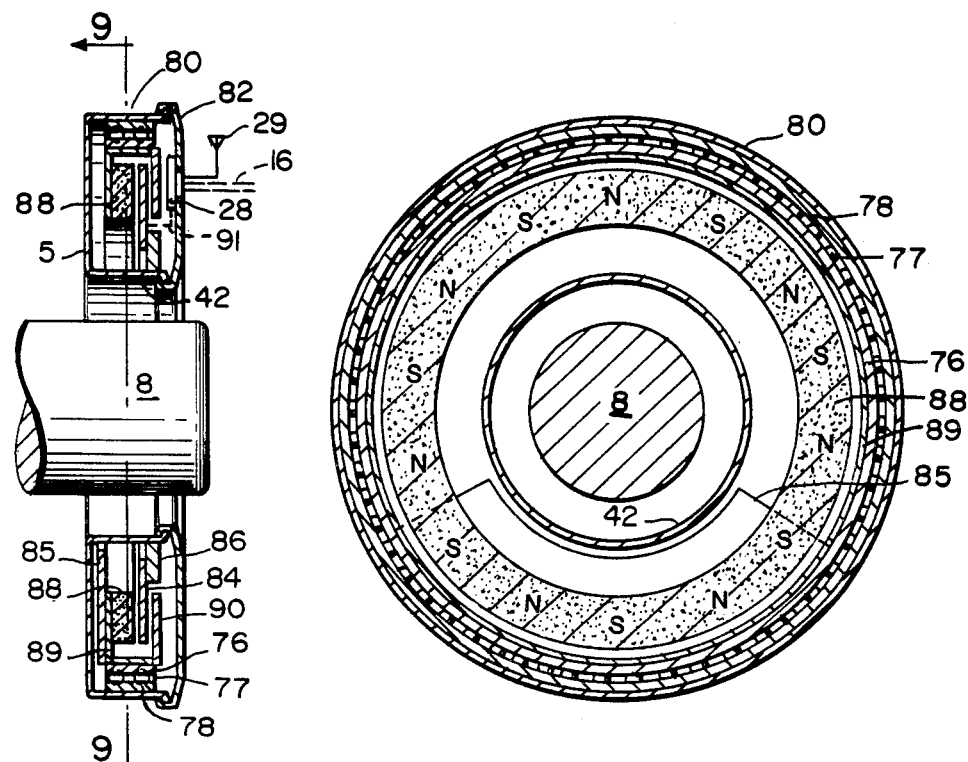
FIG. 8 is a partial cross-sectional side elevation of a second embodiment of the invention, employing a pancake armature.
FIG. 9 is a cross-sectional front view of the embodiment shown in FIG. 8.

FIG. 1 discloses the overall environment in which the present invention is used, illustrated as a vehicle, generally designated by reference number 1, and consisting of a tractor 2 and a semi-trailer 4.

The inventive electrical generating system includes a generally toroidal housing 5 that can be passed over the end of axle end 8 to be mounted to the wheel structure, as shown in FIGS. 2 and 3. As can be clearly seen from FIGS. 2, 3 and 6-10 the inner wall of the toroidal housing 5 is mounted in a spaced-apart relation from the axle 8. A valve-mounted sensor 12, of the general type disclosed in U.S. Pat. No. 3,860,772, is affixed to the tire valve 14 of the wheel 6. The switch settings from the sensor 12 are transmitted to a transmitter 28 (see FIG. 4) mounted in the housing 5 by means of an electrical cable 16.

FIG. 3 shows a partial side elevational view of the central region of the wheel shown in FIG. 2, and shows the housing 5 being affixed by a pair of mounting straps or brackets 18 attached at their interior ends to the housing 5 by suitable fasteners 20. The outer ends of the mounting brackets 18 are secured by wheel retaining nuts 24 carried on the wheel studs 22. A damping means, as well-known in the art, may suitably be affixed to the housing 5 and brackets 18 to diminish shock and vibration.

FIG. 4 shows a functional block diagram of a typical warning system 34, such as would be mounted on a respective wheel. A generator 26 powers a transmitter 28, the transmitter 28 being actuated to an "on" or "off" condition responsive to control signals received from the pressure sensor 12. The generator 26 and transmitter 28 may both be located within the housing of FIGS. 2 and 3. A signal transmitting antenna 29 may be coupled through the wall of housing 5 to project therefrom and rotate with the wheel, and may be, for example, a length of conducting coaxial sleeve disposed about the sensor cable 16. Alternatively, the antenna 29 may be mounted within the housing to broadcast through the walls thereof, in which case at least a substantial portion of the walls of housing 5 must be transparent to radio frequency radiation.

An associated receiver 30, with a respective receiving antenna 36, is located on the vehicle body. A warning signal from the transmitter 28 is received by the receiver 30 and coupled to a display unit 32, located in the cab, which provides audible or visual signals to the operator by a variety of means well-known in the art. Additional receivers 30' may be positioned to similarly communicate their warning signal from the associated transmitter to the display unit 32. A single centrally-located receiver may also be employed. In such a case, each transmitter 28 may be set to broadcast a unique identifying code; and the display unit 32 may be provided with corresponding decoders to selectively actuate an audio alarm or display lights to indicate which wheel unit is sending out a signal. Such coded identification techniques are well-known in the art.

Refer now also to both FIGS. 6 and 7. The inventive system housing 5 is shaped like a toroid or doughnut, as mentioned above, and is formed of two pieces: a U-shaped housing outer wall 40; and a housing cover and mounting plate or wall 44. Outer wall 40 has a central or passage wall 42 having a passage dimensioned to accommodate an axle 8, or at least the end thereof. A ring bearing 46 is mounted on the inner surface of the passage wall 42, with the inner race 48 of the bearing affixed to the wall. A carrier bracket 54 for generator 52 is attached to the outer race 50 of the ring bearing. The electrical potential generator 52 and a transmitter 28 are mounted on bracket 54. The armature shaft 56 of generator 52 is aligned parallel to the axis of rotation of the ring bearing 46. The generator 52 and bracket 54 thus constitute a pendulum freely rotatable about the axis of rotation of the axle 8, and thus, during movement of the vehicle, will remain substantially stationary in the lower part of the housing. An internal ring gear 60 (best seen in FIG. 7), affixed to the housing cover plate 44 or outer wall 40, engages pinion 58 attached to the armature shaft 56. Rotation of the wheel 6 causes the entire housing 5 (and, hence, ring gear 60) to rotate about generator 52, driving gear 58 affixed to armature shaft 56, thereby generating electrical power.

Electrical leads (not shown) from the generator 52 couple power to the transmitter 28. The transmitter 28 output is coupled to antenna 29, here shown in the form of a circular arc disposed within the housing 5 assembly. The antenna 29 transmits its signal to the antenna 36 of receiver 30 (see FIG. 4). As mentioned above, in this embodiment, a portion of the housing assembly is made of a dielectric material. A sensor cable 16 (see also FIG. 2) enters housing 5 through an entrance hole 68 in rear plate or wall 44. The sensor leads 66 are shown functionally as contacting two slip rings 62 mounted on a slip ring block 64 (see FIG. 6) fixedly attached to the rear housing wall 44. As also mentioned above, antenna 29 could also extend outwardly. Further, with proper R.F. insulation of housing 5 through hole 68, the antenna 29 could be coupled to the transmitter 28 via the same slip ring/brush assembly. A brush holder 70 carries a pair of brushes 72, which are disposed to make contact with the slip rings 62, which are in turn affixed to the generator carrier 54. Leads 74, indicated by arrowed lines, convey the sensor settings from the slip rings 62 to the transmitter 28 to activate the transmitter to transmit a warning signal when the sensor senses a low pressure condition. The above-described means of making power and signal connections are known in the art.

The inventive generator can be mounted completely around an axle and disposed inboard of its outer end, as clearly seen from FIG. 6. It will also be noted that this system contains a principal advantage recited in Applicant's pending application, namely, a means for driving the associated generator overspeed with respect to the wheel rotation rate, owing to the marked difference in the diametric ratio between the generator pinion 58 and ring gear 60.

FIGS. 8 and 9 show a second embodiment of the invention, configured to provide an even more narrow profile than the embodiment of FIGS. 6 and 7. The housing 5 is again configured in toroidal form, and is disposed about the axle 8, as in the embodiments of FIGS. 6 and 7. Basically, the embodiment of FIGS. 8 and 9 provides a structure wherein the pancake armature 84 rotates with the wheel and the magnets 88 are stationary. More specifically, the housing 5 includes a rear U-shaped element 80, with a wall 42 forming a passage in its center and a housing cover 82, which are affixed together, forming a toroidal configuration or doughnut-shaped housing. A ring bearing 77 includes an outer race 78, affixed to the outer wall of element 80 and its inner race 76 affixed to the magnet holder 89. The pendulum weight 85 is affixed to the magnet holder 89. A centrally apertured pancake armature 84 is mounted on armature hub or holder 86, which in turn is fixedly mounted on the inner wall 42 of housing 5. The armature 84 is positioned to move between the magnets 88 and the flux return plate 90. The magnets 88 and holder 89, which are attached to the pendulum weight 85, remain substantially stationary while the housing 5 and the armature 84 rotate with the wheel to thereby generate an electromagnetic potential, as is well-known.

Since the armature 84, transmitter 28 and cable 16 rotate with the housing 5, no electrical contact brushes or slip rings are necessary. The electrical loads, indicated at 91, can connect the electrical potential to the transmitter 28 and the associated electronic circuitry (not shown), which may be suitably mounted on the cover 82. The sensor cable 16 and the antenna 29 extend outwardly through suitable openings in the cover 82.

FIG. 10 shows another embodiment of the system similar to the embodiment of FIGS. 8 and 9, and also utilizing a pancake armature. In this embodiment, the housing 5 is also configured as a toroid. The inner race 76 of ring bearing 77 is affixed to the passage wall 42 of the housing element 80. An armature hub 86 is secured to the rotatable outer race 78 of the bearing 77, the hub having a hub weight 85 affixed to a portion thereof, with the result that the pendulum action of the hub weight causes the armature hub 86 to remain stationary during rotation of the housing 5. A pancake armature 84 is affixed to the hub 86, and therefore remains stationary as the associated wheel and housing rotate. A ring-shaped magnet structure 88, consisting of a plurality of magnets contained within a flux return plate structure 90, causes a magnetic flux to interact with the windings of the pancake armature 84. Thus, during rotation of the housing 5, the magnet structure also rotates and a voltage is induced in the windings of the armature 84. Importantly, the pancake armature 84 comprises a disc-shaped cylinder, with an enlarged central aperture to accommodate housing 5. Armature 84 has a large outside diameter which obtains a high peripheral speed to interact with the toroidal-shaped multipole magnet structure 88, having magnets which are mounted to have a similar peripheral diameter. In contrast to known pancake armature structures, armature 84 is not mounted on a shaft and may be considered as "driveless".

A conventional generating system relying on wheel RPM of a vehicle to drive its rotor will find the electrical potential insufficient due to the RPM of its rotor in relation to its stator. The unique disc-shaped armature and its related toroidal-shaped multipole magnet structure employ peripheral speed of the large-diameter armature relative to the large-diameter magnet structure to obtain a substantially greater electrical potential.

The present pancake armature is approximately twice the diameter of a conventional pancake armature; and, hence, the peripheral speed of the armature and the rate at which the flux lines of force are cut upon relative rotation of the present structure, is essentially many times faster than conventional armatures. Hence, the voltage developed thereby is essentially many times higher in amplitude, according to the known mathematical formulas. Further, the present armature is of minimum weight due to the elimination of the center portion of the armature disc; and, also, as are pancake armatures generally, the present armature and the overall apparatus have a narrow profile.

A circuit board 94, configured preferably in the form of an annular ring, is suitably mounted and rotates with housing 5, and carries a pair of brush carriers 92. The carriers 92 contain power pick-off brushes 96, which contact the substantially stationary armature and pick off the induced voltage through brush leads indicated by arrowed lines 98 to power elements 100 of the transmitter 28 disposed on the circuit board. The antenna may simply be laid around on the surface of the circuit board 94 in the form of a circular arc. Since, in this version, the transmitter rotates with the housing, no slip rings are necessary to bring the sensor leads into the structure.

FIG. 5 is a partially-sectioned view of a conventional wheel 102 and rim 104 mounted on a disc brake assembly. Dotted rectangles labeled "A" represent the skeletal cross-section outlines of a ring generating system in accordance with the invention, disposed as described above. Dotted rectangles labeled "B" and "C" show alternative dispositions of the ring generating system, wherein the unit B is placed to reside in the passage 107 immediately behind wheel flange 106 or, alternatively as at C, immediately inboard of the wheel 102. When the ring generating system is positioned in location C, the inner wheel may become the rear section of the housing 5. When positioned in the locations B or C as shown, the ring generating system is protected from accidental external contact; and, additionally, protection is afforded from road debris, such as stones, thrown up from the highway, because the unit is generally enshrouded by the braking disc 110 and the splash shield 108. The units may be attached in the position by suitable brackets or holders obvious to those skilled in the art. It is generally understood that the wheel plate itself could become part or all of the housing.

While, for the purposes of illustration, various forms of this invention have been disclosed, other forms may become apparent to those skilled in the art upon reference to this disclosure; and, therefore, this invention shall be limited only by the scope of the appended claims.

I claim:

1. A wheel mountable ring assembly for surrounding an axle of a wheel, comprising, in combination: a ring shaped housing having an outer side wall, front and rear face walls, and an interior passage wall forming an interior passage, said housing being mountable for rotation with the wheel and with said passage wall disposed around the axle in a spaced-apart relation, electromagnetic potential generating means, a drive shaft for said generating means, a driven gear means mounted on said drive shaft, a ring gear mounted in said housing, gear teeth on said ring gear engaging said driven gear means, bearing means rotatably journaled on said interior passage wall within said housing, said generating means mounted from said bearing means and suspended thereby as a pendulum to maintain a substantially non-rotating condition whereby rotation of said housing and said wheel causes said ring gear to drive said driven gear means and said drive shaft to actuate said generating means to develop electrical power.

2. An apparatus as in claim 1, wherein said ring gear actuates said driven gear means in an overspeed relation relative to the rotation of said axle and said housing.

3. An apparatus as in claim 1, wherein said bearing means includes an inner race mounted on the interior passage wall of said housing and an outer race supporting said generating means.

4. A driveless electrical generator for positioning around an axle adjacent a wheel assembly, comprising, in combination: a toroidal-shaped housing adapted to be mounted to surround the axle in a spaced-apart relation and for rotation with the wheel assembly, electromagnetic potential generating means including a pancake armature means and magnet means mounted in said housing, said pancake armature means having a central opening for conforming to said toroidal-shaped housing, said armature means affixed to said housing for rotation therewith, circular bearing means mounted in said housing, said magnet means being mountable on said bearing means, weight means depending from said bearing to form a pendulum to maintain a non-rotating condition when said wheel assembly rotates whereby said pancake armature means does not require a drive shaft for rotation thereof.

5. An apparatus as in claim 4, wherein the pancake armature means is of a diameter of substantially the same dimension as the periphery of said housing and said magnet means is located contiguous the periphery of said armature means to obtain a high peripheral speed of said armature means relative to said magnet means to enhance the output of said generating means.

6. An apparatus as in claim 4, wherein said magnet means is affixed to a portion of said housing, and said armature means is mountable from said bearing means whereby said magnet means rotate with said housing and said armature means remain relatively stationary with said non-rotating pendulum means.

7. A wheel mountable ring assembly for surrounding an axle of a wheel, comprising, in combination: a toroidal housing having an outer side wall, front and rear face walls, and an interior passage wall forming an interior passage, said housing adapted to be mounted with said passage wall disposed around said axle in spaced apart relation to said axle, and for rotation with said wheel, electromagnetic potential generating means including rotor and stator means, circular bearing means journaled within said housing, said bearing means comprising at least one member rotatable with said housing and at least a second member rotatable with respect to said first member, pendulum weight means, said rotor and stator means being mounted in said housing for rotation as said housing rotates, and said stator means and pendulum weight means depending from said second member of said bearing means and suspended thereby to maintain a non-rotating condition of said stator means and said pendulum weight means, whereby rotation of said housing by said wheel causes electromagnetic interaction of said stator and rotor means to develop electrical power.

8. A wheel mountable electromagnetic potential generating means as in claim 7 wherein said rotor means comprises an armature means and said stator means comprises magnet structure means.

9. A wheel mountable electromagnetic potential generating means as in claim 7 wherein said rotor means comprises magnet structure means and said stator means comprises armature means.

* * * * *

UNITED STATES PATENT AND TRADEMARK OFFICE
CERTIFICATE OF CORRECTION

PATENT NO. : 4,539,497
DATED : Sept. 3, 1985
INVENTOR(S) : Robert E. Boyer

It is certified that error appears in the above-identified patent and that said Letters Patent is hereby corrected as shown below:

The term of this patent subsequent to Aug. 20, 2002 has been disclaimed.

Signed and Sealed this

Twenty-second Day of October 1985

[SEAL]

Attest:

DONALD J. QUIGG

Attesting Officer

Commissioner of Patents and Trademarks—Designate